(12) United States Patent
Betzer Tsilevich

(10) Patent No.: US 8,551,200 B2
(45) Date of Patent: Oct. 8, 2013

(54) FLUID BED DIRECT CONTACT STEAM GENERATOR SYSTEM AND PROCESS

(75) Inventor: Maoz Betzer Tsilevich, Southwest Calgary (CA)

(73) Assignee: Ex-Tar Technologies Inc., Calgary, Alberta (CA)

( * ) Notice: Subject to any disclaimer, the term of this patent is extended or adjusted under 35 U.S.C. 154(b) by 1032 days.

(21) Appl. No.: 12/549,702

(22) Filed: Aug. 28, 2009

(65) Prior Publication Data

US 2010/0050517 A1 Mar. 4, 2010

Related U.S. Application Data

(60) Provisional application No. 61/092,669, filed on Aug. 28, 2008, provisional application No. 61/092,668, filed on Aug. 28, 2008.

(51) Int. Cl.
| | |
|---|---|
| *C01B 3/36* | (2006.01) |
| *F02C 7/00* | (2006.01) |
| *F02C 3/26* | (2006.01) |
| *F02C 3/00* | (2006.01) |

(52) U.S. Cl.
USPC .... 48/197 R; 60/39.53; 60/39.55; 60/39.464; 60/775

(58) Field of Classification Search
USPC .......... 48/61, 127.9, 127.1, 197 R, 198.3, 76, 48/77, 78, 63, 64, 203, 210, 212, 215; 60/39.53–39.55, 39.461–39.465, 775
See application file for complete search history.

(56) References Cited

U.S. PATENT DOCUMENTS

| | | | |
|---|---|---|---|
| 4,377,066 A | 3/1983 | Dickinson | |
| 5,967,098 A | 10/1999 | Tanca et al. | |
| 2003/0019356 A1* | 1/2003 | Herden et al. | 95/108 |
| 2004/0037752 A1* | 2/2004 | Herzog | 422/131 |

* cited by examiner

*Primary Examiner* — Matthew Merkling
(74) *Attorney, Agent, or Firm* — Egbert Law Offices, PLLC

(57) ABSTRACT

The present invention is a method and system for vertically producing a steam and combustion gas mixture, typically used in enhanced oil recovery processes. The system is a fluid bed up-flow combustor system, including a vertical vessel with fours sections. In a first section, fuel, oxidizer, and possibly water are supplied to the high pressure combustor at a combustion section of a vertical vessel. The combustion gas from the first section flows to a second section for steam generation, where low quality water is injected and turned into steam. Next, the third section is a homogenizer vessel, where any remaining water drops are converted to steam and solid particles and discharged from the vessel. The fourth section located at the bottom of the vessel is a fluid bed, receiving and processing the falling solids from the combustion and the steam generation sections.

13 Claims, 8 Drawing Sheets

FLUID BED DIRECT CONTACT STEAM GENERATOR SYSTEM AND PROCESS

RELATED U.S. APPLICATIONS

The present application claims priority from U.S. Provisional patent application Ser. No. 61/092,669, filed on Aug. 28, 2008 and entitled "FLUID BED DIRECT CONTACT STEAM GENERATOR SYSTEM AND PROCESS." The present application also claims priority from U.S. Provisional patent application Ser. No. 61/092,668, filed on Aug. 28, 2008 and entitled "VERTICAL ZERO LIQUID DISCHARGE DIRECT CONTACT UP-FLOW STEAM GENERATOR SYSTEM AND PROCESS".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a steam generating method with an overall process of producing gas mixtures ready for enhanced oil recovery (EOR). In particular, the present invention relates to a direct contact steam generator with a fluid bed at a bottom of the generator vessel.

2. Description of Related Art Including Information Disclosed Under 37 CFR 1.97 and 37 CFR 1.98.

The fluid bed contains inorganic particle waste resulting from evaporated water or from used solid fuel. The fluid bed does not contain a fuel component, and solids are continually removed from the fluid bed as dry waste. There is no combustion in the fluid bed, but rather above the fluid, where the fuel and oxygen-rich gas are mixed.

There are patents issued in the field of the present invention. U.S. Pat. No. 4,377,066 issued to Dickinson on Mar. 22, 1983 describes a process for the combustion of slurry fuels in an up-flow pressurized fluidized bed. The water supplied with the fuel and the oxidizing gas are further condensed through a series of indirect heat exchangers and used to scrub the combustion solids. The solids are removed from the water. The combustion is done in a typical fluidized bed method where the pressurized oxidizer (air) is injected from below the fluidized bed fuel particles to support combustion. The combustion reaction is carried while the fuel is in the fluidized bed. The present invention includes a cold fluidized bed that does not include the carbonic fuel or support the combustion reaction. The fluid bed of the present invention, will support, solidify and eventually remove the solid particles from the supplied water and to some extent from the fuel. The method eliminates the need for a quenching bath and allows a pure ZLD (Zero Liquid Discharge) system.

U.S. Pat. No. 5,967,098 issued to Tanca et al. on Oct. 19, 1999 describes a process for fluid bed combustion of fuels, like oil shale in an up-flow atmospheric fluidized bed. Most of the combustion energy is recovered in the form of steam generated in boiler heat exchangers (non-direct steam generation) where there is no mixture of the low pressure flue gas with the steam. In one embodiment, only a portion of the energy is recovered to produce steam in an indirect heat exchanger at the bottom of down-flow combustor where the cold fluid bed is at the bottom of the pressurized vessel and most of the energy is used to generate the steam in a direct contact heat exchange while mixing the liquid water with the combustion gas. In the Tanca invention, all the water used for generating the steam (in the boiler heat exchangers) is treated clean BFW (Boiler Feed Water). The up-flow fluid bed of the Tanca patent is used to support the fuel and oxidizer mixer and combustion. The present invention includes a cold fluidized bed that does not include the carbonic fuel or support the combustion reaction.

BRIEF SUMMARY OF THE INVENTION

The present invention is a method for vertically producing a steam and carbon dioxide mixture, comprising the following 4 sections with 4 steps:

Section A comprises the step of mixing a low quality fuel, low quality water, and an oxidation gas that contains oxygen in stoichiometric ratio or close it, and combusting the mixture under high pressure and temperature. The fuel is selected from a group consisting of coal, pet-coke, asphaltin, vacuum residuals (VR), untreated crude oil in a slurry form or any other available carbon or hydrocarbon fuel. Solid carbon fuel is grinded and mixed with water. There are commercially available packages for grinding, mixing and pumping solid fuels that are used by the oil industry. The low quality water maybe tailing pond water with high levels of TSS, TDS and organics. It can be brackish water or sewage effluent water. The oxidation gas is selected from a group consisting of oxygen, oxygen-enriched air, and air.

The combustion converts the fuel to a gas and solid byproducts such as slag, fly ash and char. The solid byproducts are in solid, liquid (melted) or sticky (partly melted) form. The combustion section can incorporate a heat exchanger to use up to 45% of the generated combustion heat to generate super-heated steam and gas mixture from saturated steam and gas mixture.

Section B comprises the step of injecting and mixing liquid water to the flowing combustion gas. The water can contain high level of suspended and dissolved solids and organics. The amount of injected water is such that all the liquid water is converted into steam. The remaining solid particles are mixed with the gas flow.

Section C is the homogenizing and discharging section that ensures that all the liquids were converted to gas and solids to prevent deposits on the down-flow pipe and equipment and discharge the produced steam, gas and solid mixture.

The temperature of the produced steam, carbon dioxide, nitrogen (if air is used as the oxidizing gas) and dry solids leaving from section C are between 200° C. and 800° C. and the pressure is between 103 and 10,000 kpa.

Section D is a fluid bed section at the bottom of the vessel. Cold gas is injected and up-flow through the fluid bed section. Solids that were generated by the combustion and from the water turning into steam are cooled by the fluid bed cold gas up-flow and eventually removed by the solid discharge from the vessel bottom. The cold gas temperature and the temperature of the fluid bed are relative to the combustion section and it is slightly lower than the discharge steam temperature, in the range of 150° C. and 500° C.

The invention also describes the integration of the steam generating method with the overall method to produce gas mixtures for EOR. The solids-rich gas leaving the vertical steam generator flows to a cyclone solid separation where the solid lean gas flow recycled and directed back to the fluid bed. The solids-rich flow is processed by a dry solids separation unit, commercially available in package units that may include cyclonic separators, centrifugal separators, mesh separators or different combinations of gas-solid separation technologies. Solids are removed from the gas flow for disposal. The gas, with some solid remains washed by mixing the gas and steam with saturated water of high temperature and pressure, so as to produce a saturated wet steam and gas mixture, scrubbing any remaining solids from the gas, separating the liquid phase from the gas phase, and recycling the water with the scrubbed solids back to the fluid bed steam generation vertical chamber. In the event that the gas contains sulfur, and if there is a need to reduce the amount of sulfur, the process can include adding lime, like in the form of lime stone, to the solid scrubbing, saturated liquid water in the vessel where the lime will react with the sulfur while generating gypsum solids.

The saturated steam and gas mixture is heated in a heat exchanger with the hot gas phase that leaves the combustion chamber. The heated gas product is a solid free, super-heated dry steam and gas mixture, preventing condensation on the pipes of the apparatus.

The pressure of the clean, wet steam is reduced to an injection pressure. The pressure of the dry steam and gas mixture is between 800 and 10,000 kpa. The temperature of the dry steam and gas mixture is between 170° C. and 650° C. The super-heated dry steam and gas mixture can be injected into an underground reservoir through a vertical or horizontal injection well, for EOR.

The dry extraction of produced solid waste and the dissolved solids that was brought in with the consumable water is advantageous. This is because it eliminates the need for additional treatment facilities to remove dissolved solids from the supplied water and to treat the quenching water with filter presses, evaporators, crystallizers or any other method.

The present invention is also a system for vertically producing a steam and carbon dioxide mixture, comprising the following 4 sections:

Section A comprises a burner for mixing and combusting a low quality fuel, low quality water, an oxidation gas that contains oxygen in stoichiometric ratio, and combusting the mixture under high pressure and temperature. The fuel is selected from a group consisting of coal, pet-coke, asphaltin, VR, untreated crude oil in a slurry form or any available carbon or hydrocarbon fuel. Solid carbon fuel is grinded and mixed with water. There are commercially available packages for grinding, mixing and pumping solid fuels that are used by the oil industry. The low quality water maybe tailing pond water with high levels of TSS, TDS and organics. It can be brackish water or sewage effluent water. The oxidation gas is selected from a group consisting of oxygen, oxygen-enriched air, and air.

The combustion converts the fuel to a gas and solid byproducts such as slag, fly ash and char. The solid byproducts are in solid, liquid (melted) or sticky (partly melted) form. The combustion section includes a heat exchanger to use portion of the generated combustion heat to generate super-heated steam and gas mixture from saturated steam and gas mixture.

Section B is adjusted to section A. It includes water injectors that inject liquid water to the flowing combustion gas. The water can contain high levels of suspended and dissolved solids and organics. The amount of injected water is such that all the liquid water is converted into steam.

Section C is adjusted to section B. It includes a vertical vessel with flow deflectors that ensure flow mixture and prevents any liquids remains or large, possible sticky, solids particles from flowing with the produced steam, gas and solid mixture and deposit on the down-flow pipe and equipment.

Section D is a fluid bed section at the bottom of the vessel. It includes cold gas injector and dispenser. The fluid bed section contains solids that were generated from the fuel and from the water turning into steam. The fluid bed solids are maintained at relatively cold temperature by the cold gas up-flow. The solids eventually removed from the system by the solid discharge from the vessel bottom. The cold gas temperature and the temperature of the fluid bed are close to the discharge steam temperature, in the range of 150° C. and 500° C.

DETAILED DESCRIPTION OF THE INVENTION

Figure 1:
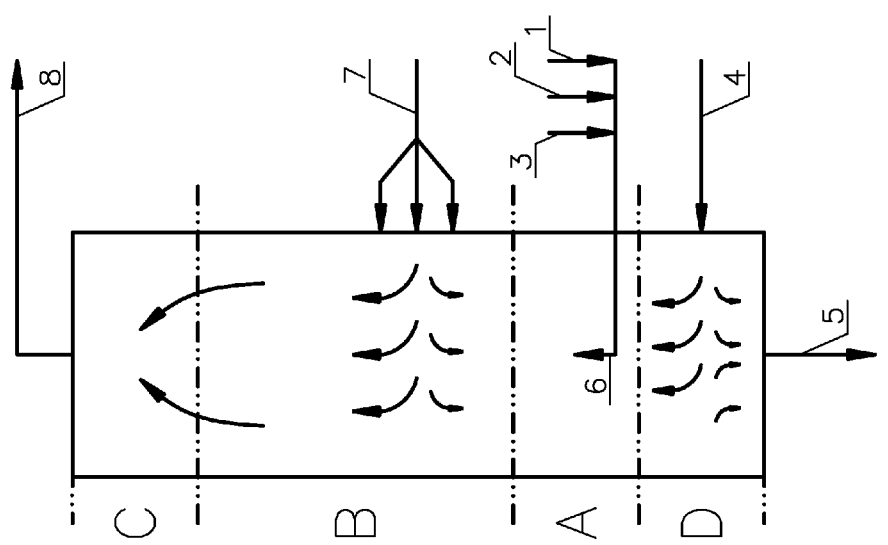
FIG. 1 is a schematic view of the fluid bed with an up-flow combustor for the direct contact steam generator of the present invention.

FIG. 1 shows is a schematic view of the four steps of the fluid bed up-flow combustor of the present invention. Fuel 1, oxidizer 2, and water 3 are supplied to a high pressure combustor 6 at section A which is located at the lower section of the vertical vessel. The fuel 1 may be coal slurry, petcoke slurry, hydrocarbons such as untreated heavy low quality crude oil, VR (vacuum residuals), asphaltin, or any available carbon fuel. The oxidizer gas 2 can be oxygen, enriched air or oxygen. The combustion is stoichiometric, and the amount of heat energy generated is greater than in partial combustion, resulting in extremely high temperatures. The temperature is controlled by the water injected to the combustor 3. The water can be supplied with the fuel in a slurry form. The combustion gas flows upward to steam generation section B where low quality water 7 is injected into the up-flow combustion gas. All of the liquid water turns into steam, leaving the water TSS and TDS solids mixed with the up-flow gas flow. Large solid particles remaining from the water fall down by gravity to the fluid bed in section D. The produced steam, gas and solid mixture flow to the homogenizer section C at the top of the vessel, where any remaining water drops are converted to steam and discharged from the upper vessel section 8. Section D located at the bottom of the vessel includes a fluid bed where cold gas 4 is injected and suspends the solids particles. The temperature of the injected cold gas is at the range of the discharged gas temperature 8. Melted or semi-melted slag in a sticky form is cooled down by the relatively cooled gas 4 and become non-sticky solid particles. An outline of the method of the present invention is shown in FIG. 3.

Figure 2:
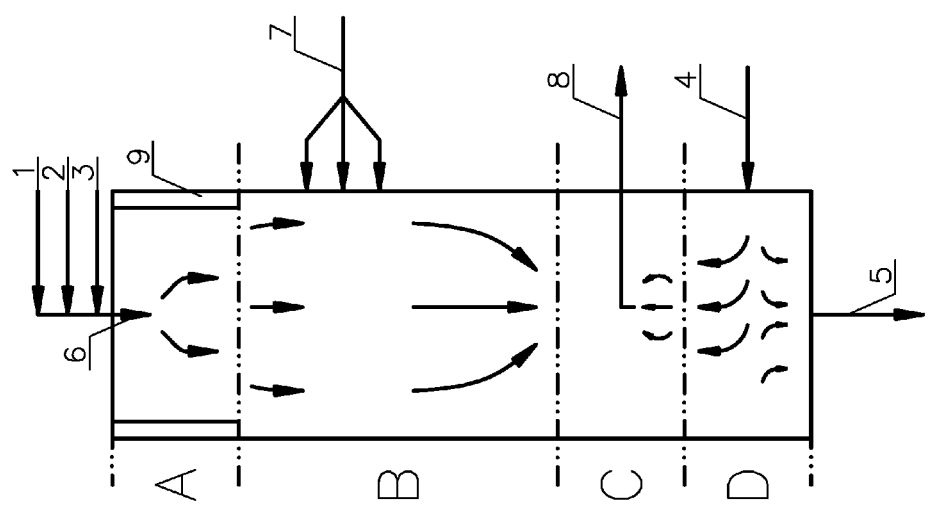
FIG. 2 is a schematic view of another embodiment of the fluid bed with down-flow combustor integrated with internal heat exchanger and water injection for direct contact steam generator and bottom solid discharged of the present invention.

FIG. 2 is a schematic view of another embodiment of a fluid bed with a down-flow combustor integrated with internal heat exchanger and water injection for direct contact steam generator and bottom with solids discharge of the present invention. Fuel 1, oxidizer 2, and water 3 are supplied to a high pressure combustor 6 at section A, which is located at the top of the vertical vessel. The fuel 1 may be coal slurry, petcoke slurry, hydrocarbons, such as untreated heavy low quality crude oil, VR (vacuum residuals), asphaltin, or any available carbon or hydrocarbon fuel. The oxidizer gas 2 can be oxygen, enriched air or oxygen. The combustion is stoichiometric, and the amount of heat energy generated is greater than in partial combustion, resulting in extremely high temperatures especially if oxygen is used as the oxidizer. The temperature is controlled by the water injected to the combustor 3. The water can be supplied with the fuel in a slurry form. The combustion section can include a radial heat exchanger 9 that is located near the vessel wall. The heat exchanger heats a saturated, solid free steam and gas flow 10 to generate a dry, super heated steam and gas flow or generate high pressure pure steam from treated BFW (Boiler Feed Water) ready for injection for EOR. The combustion gas with the generated solids, possibly in liquid form (like melted slag) flows downward to the direct contact steam generation section B. In this section low quality water 7 are injected and disperse into the down flowing gas flow.

The water converted to gas leaves the solids in a dry particle form mixed with the gas. The low quality water can contain high levels of TDS, TSS and organics contaminations. The gas and solids flow to the discharge section, located low at the vessel. In this section, the gas flow is deflected and forces a change direction to improve the mixture and to prevent large solid particles, possible in a sticky form and possible liquid droplets from discharging with the gas flow out from the system where it can settle in down-flow pipe and equipment. At the bottom of the vessel, there is the fluid bed section D where cold gas 4 circulates and flows upwards to suspend the solids bed. Solids are discharged from the bottom of the vessel 5 to maintain the bottom fluid bed solids level. The up-flow velocity above flow 4 in section D and below discharge flow 8 in section C, is in the range of 0.2 m/sec to 6 m/sec to support the upward carry-on solids particle size of up to 1.2 mm. An outline of the method of the present invention is shown in FIG. 3.

Figure 3:
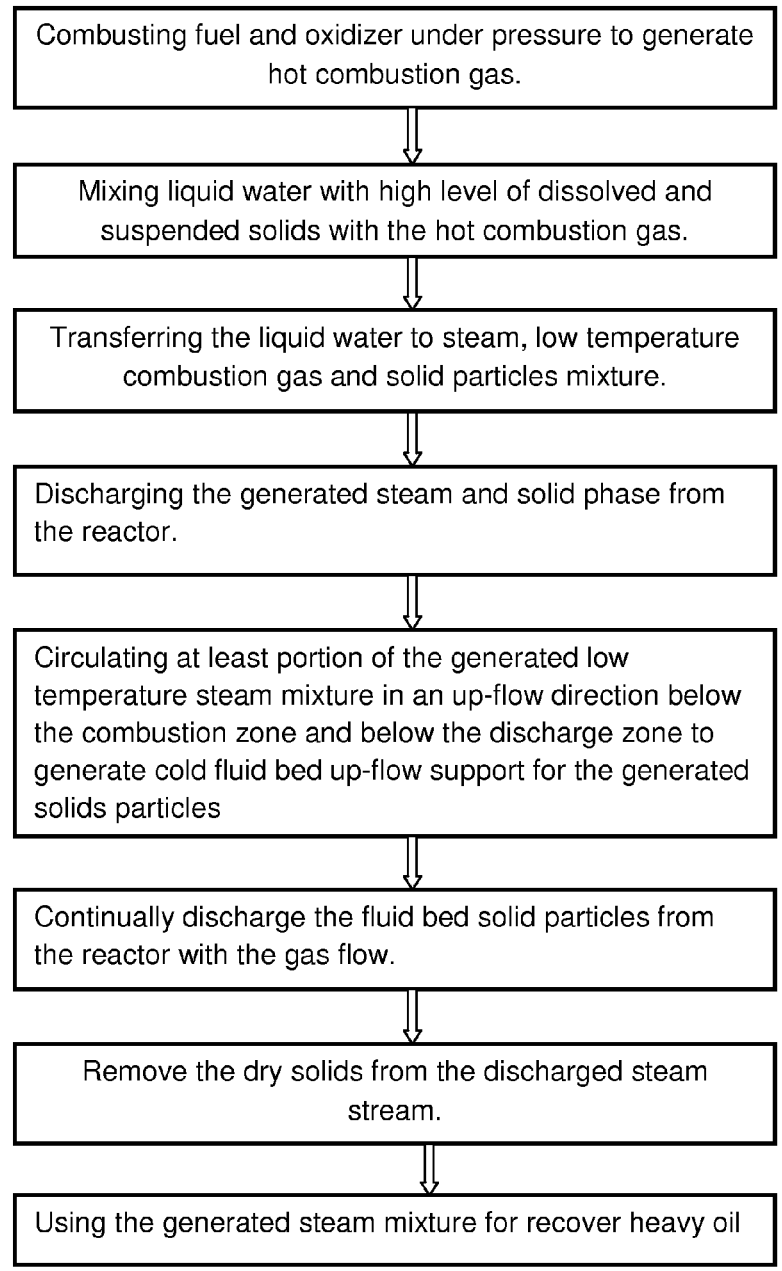
FIG. 3 is a diagrammatic illustration of the process of the present invention.

FIG. 3 is a diagrammatic outline of the method of the present invention.

Figure 4:
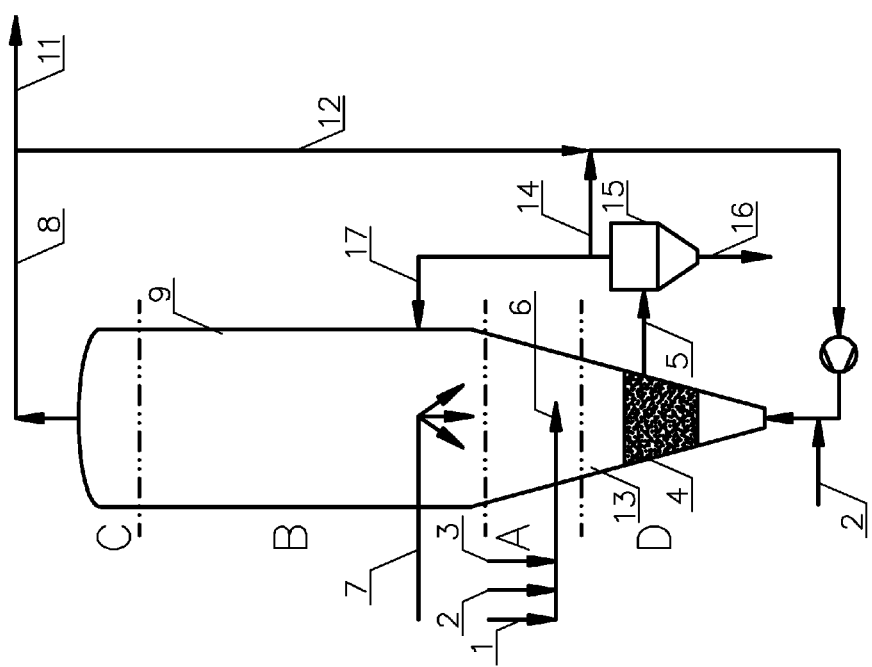
FIG. 4 is another schematic view of the vertical up-flow fluid bed direct contact steam generator with produced gas circulation through the fluid bed and solids removal.

FIG. 4 shows a view of the four steps of the fluid bed up-flow combustor of the present invention. Fuel 1, oxidizer 2, and water 3 are supplied to a high pressure combustor 6 located at section A, which is located at the lower section of the vertical vessel. The combustion gas flows upward to steam generation section B where low quality water 7 is injected into the up-flow combustion gas. All the liquid water turn into steam leaving the water TSS and TDS solids mixed with the up-flow gas flow. Large solid particles remaining from the water can fall down by gravity to the fluid bed in section D. The produced steam, gas and solids discharged from the top of the vessel 8. Portions of the produced gas 8 are recycled back 12 and injected upwards through the fluid bed at the vessel bottom to generate the cold bed bottom effect. Some cold oxidizer 2, can be injected with the recycled gas 12 to the fluid bed section D to further lower the temperature of the up-flowing recycled gas 12 and support the combustion at section A. Solids are continually removed from the vessel 5 through a solid separation unit 15. The lean solid gas flow 14 recycled back to line 12. The solids are removed from the solid separation unit in a dry form, where it can be discharged in a landfill. The up-flow velocity above flow 12 in section D is in the range of 0.2 m/sec to 3 m/sec to support the carry-on solids.

Figure 5:
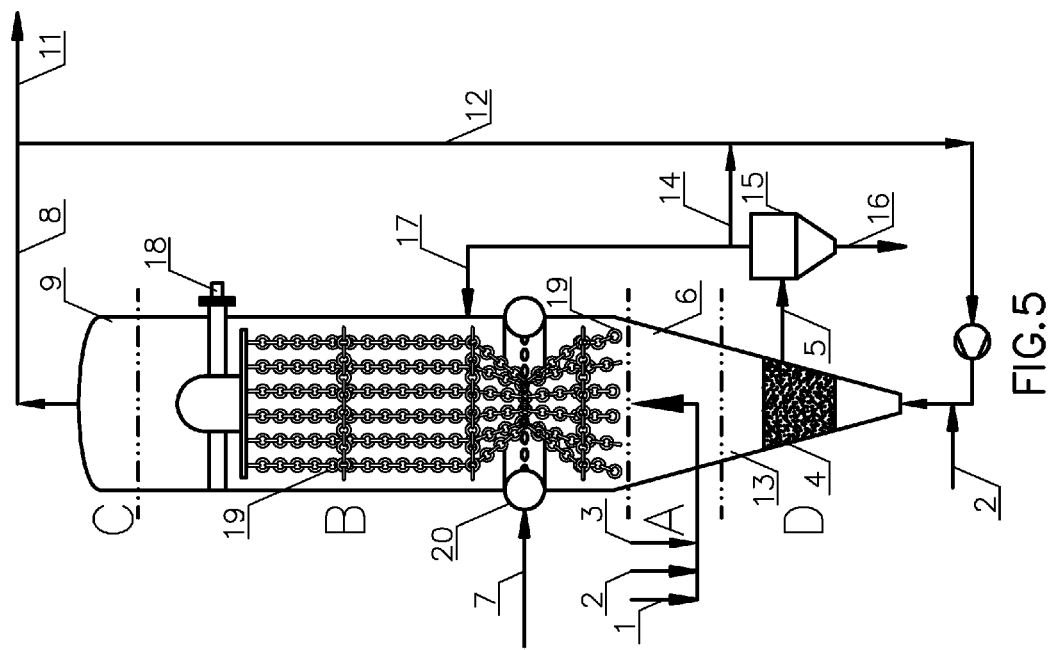
FIG. 5 is another schematic view of the vertical up-flow fluid bed direct contact steam generator with produced gas circulation and chain internals to improve the heat transfer and remove solids build-ups.

FIG. 5 shows a view of the four steps of the fluid bed up-flow combustor of the present invention as described in FIG. 4 with modified steam generation section B. The heat transfer in section B is improved by the use of chains 19 that enhanced the direct contact heat transfer sufficiency of the flowing combustion gas and the injected water. Low quality water 7 injected all around the vessel wall through circular injector 20. The chain improved the heat transfer between the flowing combustion gas and the water. Solids generated by the evaporated water will settle on the chains 19. Because the chains are made from links that are free to move, the relative movement of the links will break-off solids that have built-up. To enhance this self-cleaning behavior the chains can move mechanically though sealed rotating shaft 18 that can continually move or move in intervals.

Figure 6:
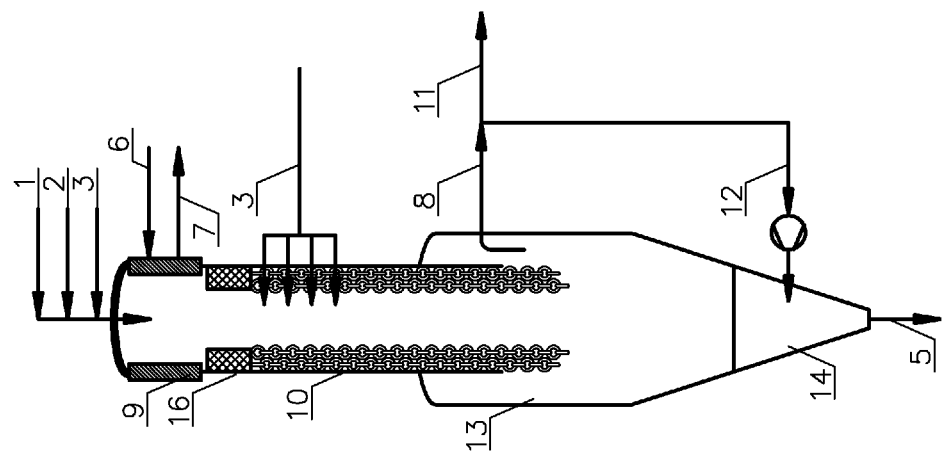
FIG. 6 is another schematic view of the vertical down-flow fluidized bed direct contact steam generator with combustion heat exchanger and produced gas circulation through the fluidize bed with solids removal.

FIG. 6 is a schematic view of another embodiment of a fluid bed with a down-flow combustor integrated with internal heat exchanger and water injection for direct contact steam generator. Fuel 1, oxidizer 2, and possibly water 3 are supplied to a high pressure combustor at section A which is located at the top of the vertical vessel. The combustion is stoichiometric, and the amount of heat energy generated is greater than in partial combustion, resulting in extremely high temperatures. The temperature is controlled by the water injected to the combustor 3. If the fuel is in a slurry form, or if the oxidizer is air, then water 3 is not required. The combustion section includes a radial heat exchanger 9 located near the vessel wall to minimize its contact with the melted solids, like slag generated by the combustion. The heat exchanger is using radiation as the heat exchange method. It is important to minimize the physical contact with the melted solid particles generate by the combustor. The energy recovered through this heat exchanger is relatively small (up to maximum of 45% of the combustion energy, and typically not more than 25% of the energy). Most of the combustion heat energy is used to generate steam from the water 3 in a direct contact heat exchange and not through the non-direct radiation based heat exchanger 9. Boiler feed water or saturated steam and gas mixture 6 flows through this heat exchanger to produce super-heated dry steam and gas mixture 7 ready for EOR.

Then, the combustion gas flows downwards to the direct contact steam generation section 10, where low quality water 3 is injected to the gas flow where the liquid water turns to steam and fly solid particles. The temperature in the combustion area, that is in the range of 1200° C.-2000° C. most of the solids like the slag, are in a liquid state. The direct contact Water injection 3 immediately reduces the temperature to 350° C.-500° C. where the melted and sticky solids particles turn to solid and flow with the gas stream. To protect the structure from the high combustion temperature refractory insulation might be used 16. After the water injection section 3 the vessel wall is covered with free moving bodies like chains. Because the free movement between the chain link prevents the solids build-up on the wall and improved the direct contact heat transfer in the steam generation section 10.

The gas and solid particles flow to the discharge section 13. This section includes the gas discharge 8. The gas discharge 8 includes change in the down flow direction to ensure that large solid particles and possibly water droplet remains will not flow with the discharged gas mixture. The fluid bed section located at the bottom of the vessel 14. Heavy solid particles and other solid that were not removed with the discharged gas 8 are suspended at the fluid bed. Some of the discharged gas recycles back to the fluid bed and flows upward to create the fluid bed solid suspension effect. The up-flow gas cooled down any melted solid particles and any liquid droplets are converted to gas and solids remaining. To maintain the fluid bed solids level, dry solids are discharged from the vessel bottom 5 for disposal while most of the fine solid particles discharged at 11 and removed through gas-solid separator (not described). The generated gas temperature and pressure 11 is according to the particular heavy oil EOR requirements, typically in the range of 250° C.-400° C. and the pressure of 10 bar-40 bar.

Figure 7:
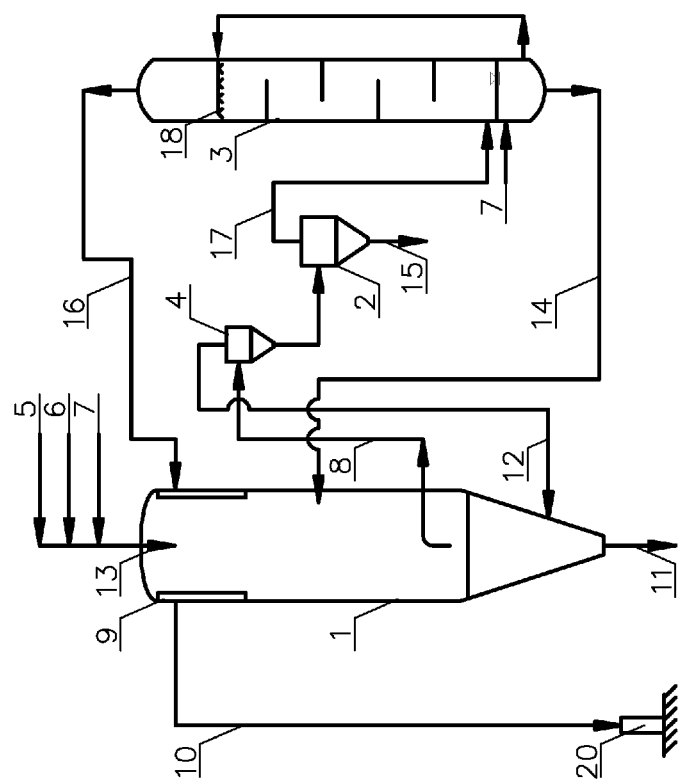
FIG. 7 is schematic view of the integration of vertical down-flow fluidize bed direct contact steam generator with saturated steam generator and solids scrubber for the production of solid free steam and gas mixture for EOR.

FIG. 7 shows the integration of vertical down-flow fluid bed direct contact steam generator with a saturated steam generator and solids scrubber for the production of solid free steam and gas mixture for EOR. Fuel 5, oxidizer 6, and possibly water 7 (as part from the fuel, if the fuel is in the form of slurry) are supplied to a high pressure combustor 13 located at the top of the vertical vessel. The combustion is stoichiometric, and the amount of heat energy generated is greater than in partial combustion, resulting in high temperatures. The temperature is controlled by the water injected to the combustor 3.

The combustion section includes a radial heat exchanger 9 located near the vessel wall to minimize its contact with the melted solids, like slag generated by the combustion. Saturated steam and gas mixture 16 flows through this heat exchanger to produce super-heated dry steam and gas mixture 10 ready for EOR. The combustion gas flow downwards to the direct contact steam generation section where it is contacted with low quality water 14 injected to the gas flow where the liquid water turns to steam and fly solid particles. The steam, gas and solid particles discharge through a change in the down flow direction 8 to ensure that large solid particles and possibly liquid droplet remains will not flow with the discharged gas mixture. The discharged gas and solid mixture separate to solid rich gas flow and solid lean gas flow 4. The solid lean gas flow 12 recycled back and injected to the vessel bottom 12 to support the fluid bed. Heavy solid particles and other solids that were not removed with the discharged gas 8 are suspended at the fluid bed. The up-flow gas 12 cooled down any melted solid particles and any liquid droplets are converted to gas and solids remaining.

Large solid particles that were not supported in the fluid bed can be discharged from the vessel bottom 11 for disposal, however most of the solids carried by the fluid bed and discharged with the produced gas 8. The solid rich steam and gas flow from separator 4 flows to a high efficiency separator 2. This separator removes the solids 15 with minimal discharge gas. Such dry gas-solid separators packages are commercially available. The solids are then disposed. The solid lean gas flow 17 flows to a wet solid scrubber and saturated steam generator 3. Water 7 is continually added to vessel 3 to maintain the liquid water level and to compensate for the water converted to steam and discharged 14.

Additional chemical materials can be added to the injected water 7. For example, if there is a need to remove sulfur oxides from the produced steam-gas mixture limestone slurry can be added to the low quality water 7. The generated calcium sulfite and calcium sulfate solids will be converted to solid particles and removed in way similar to the removal of slag and other carry-on solids that by-pass the solid separator 2. Liquid water is pumped and sprayed 18 to improve the solid scrubbing and the steam generation. Vessel 3 generates saturate solid free steam 16. This saturated steam flows through heat exchanger 9 to generate dry, superheated steam and gas mixture 10 at temperature in the range of 250° C.-400° C. and the pressure of 8 bar-40 bar. Water with the scrubbed solids 14 from vessel 3 is recycled back to the vertical steam generator 1 where the water is converting to gas and the solids removed in a dry form. The superheated steam and gas mixture 10 injected into injection well 20 for EOR.

Figure 8:
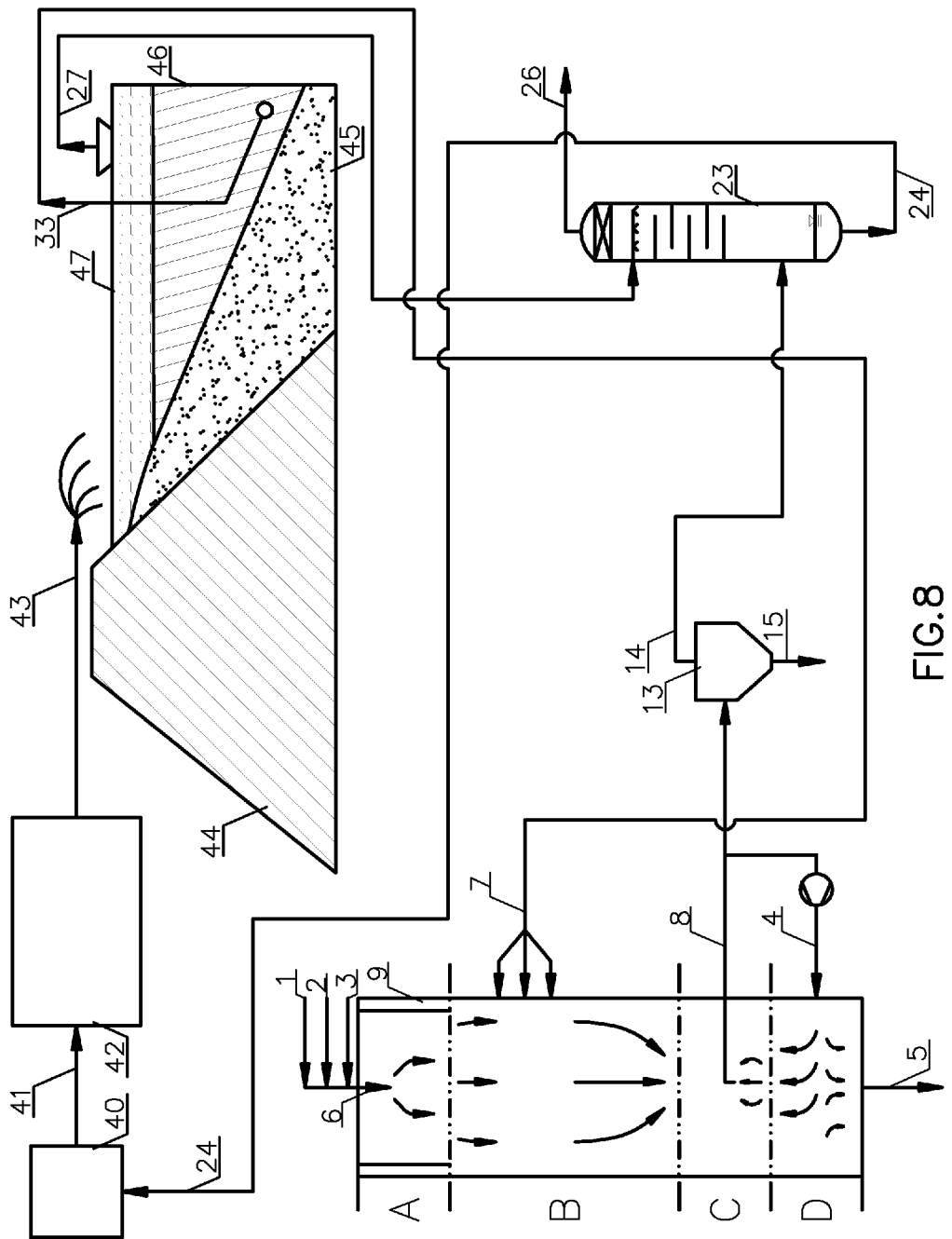
FIG. 8 is schematic view of integrated down-flow combustion unit with MFT (Mature Fine Tailing) water injection for steam generation, up-flow fluid bed, dry solids separation and direct contact heating of oils and open mine process water for bitumen extraction.

FIG. 8 is a schematic view of integrated down-flow combustion unit with cold fluid bed support for generating steam from MFT, recover the water and the heat from the produced gas mixture for heating the process water for bitumen extracting in an open mine oils and facility. Fuel 1, oxidizer 2, and possibly water 3 (if required to generate fuel slurry or to reduce the combustion temperature) are supplied to a high pressure combustor 6 at section A, which is located at the top of the vertical vessel. The fuel 1 may be any available carbon or hydrocarbon fuel. The oxidizer gas 2 can be oxygen, enriched air or oxygen. The combustion is stoichiometric. The combustion section may include a radial heat exchanger 9 that is located near the vessel wall. The combustion gas with the generated solids, possibly in liquid form (like melted slag) flows downward to the direct contact steam generation section B. In this section, MFT 7 is injected and disperse into the down flowing hot combustion gas flow. The water in the MFT converted to steam gas, leaves the solids in a dry particle form mixed with the gas.

The gas and solids flow to the discharge section C, located low at the vessel. In this section, the gas flow is deflected and forces a change direction to improve the mixture and to prevent large solid particles, possible in a sticky form and possible liquid droplets from discharging with the gas 8 flow out from the system where it can settled in down-flow pipe and equipment.

At the bottom of the vessel, there is the fluid bed section D where cold gas 4 circulates and flows upwards to support the fluid bed. Most of the solids discharged with the produced gas 8 due to the fluid bed circulation. Solids, that were not supported by the fluid bed, can be discharged from the bottom of the vessel 5 to maintain the bottom fluid bed solids level. The generated steam, combustion gas and solid mixture 8 flows to solid separation unit 13. The solids 15 are recovered in a dry form using commercial available gas-solid separation unit 13 where solids 15 in dry form removed from the process and can be trucked back to the oils and mine for disposal in landfill. The steam and NCG (None Condensable Gas) mixture 14 flows to the direct contact heating vessel 23 where the steam and gas flow upwards and the process water flows downwards to condense the steam in flow 14 and recover the condensing steam and NCG for heating the process water. The steam generated from the MFT is condensed and become part from the process water.

The tailing water from the oils and mine facility 1 is disposed of in a tailing pond. The tailing ponds are built in such a way that the sand tailings are used to build the containment areas for the fine tailings. The tailing sources come from Extraction Process and the Froth Treatment Tailings. A Sand dyke 44 contains tailing pond. The sand separates from the tailing and generates a sand beach 45. Fine tailings 46 are put above the sand beach at the middle-low section of the tailing pond. Some fine tailings are trapped in the sand beach 45. On top of the fine tailing is the recycled water layer 47. The tailing concentration increases with depth. Close to the bottom of the tailing layer are the MFT (Mature Fine Tailings). (See "The Chemistry of Oil Sands Tailings Production to Treatment" presentation by R. J. Mikula, V. A. Munoz, O. E. Omotoso, and K. L. Kasperski of CanmetENERGY, Devon, Alberta, Natural Resources Canada on Dec. 8, 2008 at the International Oil Sands Tailings Conference in Edmonton, Alberta). The recycled process water 27 is pumped from a location close to the surface of the tailing pond, (typically from a floating barge). The fine tailings are pumped from the deep areas of the fine tailings 46. MFT (Mature Fine Tailing) 33 is pumped from the lower section of the tailing pond and is then directed to the fluid bed direct contact steam generation vessel where it is continuously recycled and injected 7 to the up-flow combustion gas.

Under the heat and pressure inside the vessel, the MFT turn into gas and solids, as the water converts to steam. The steam and NCG (Non Condensable Gas) flow 14 is used to heat the process water. The process water 27 is pumped from the upper level of the tailing pond 47 or from other separation units (not shown). The process water is injected to the upper section of vertical direct contact heat exchanger vessel 23 where it is mixed and heated by direct contact with the up-flow condensing steam and combustion NCG 14. The heated process water is discharged from the vessel bottom at temperature of 70° C.-90° C. as required by the oil sand extraction facility. The pressure in the system can be at the range of 1 bar-50 bar, most preferably at the range of 3 bar-10 bar. Most of the steam generated from the MFT is condensed during the process of heating the process water 27. The cooled NCG 26 discharged from the upper section of vessel 23. The hot process water is mixed with the crushed solid oils and 40 and separate at the extraction facility 42 to produced bitumen, sand and water 43. The sand and water 43 discharged back to the tailing pond.

EXAMPLE 1

The following flow table is a simulation of a direct-contact steam generation process, as described in FIG. 7. The simulation was done for 3 different pressures as described in the following table. The heat source is petcoke internally combusted. The fuel that was used for the simulation was a high sulfur petroleum coke with 7% sulfur. The water source was disposal water with high solids content that includes, as example, some hot lime softeners sludge or fine tailing pond water. The combustion occurred in the high pressure direct contact steam generator 1 and the water mixed with the combustion gases. The combustion pressures were 1500 kpa (kilopascals), 200 kpa, and 103 kpa. The solids introduced mostly from the water were removed in a solid separator 2, which can use a cyclone design. The gas at a temperature of 280° C.-300° C., with carry-on solids was scrubbed in the solids scrubber and wet steam generator 3 to generate saturated ("wet") steam product 16. The water in scrubber 3 includes lime stone slurry to react with the SO2. The generated Calcium Sulfite and sulfate recycled back with the scrubbed solids and removed by the solid separator 2 with the other solids in a dry form. To replace the water converted to steam, make-up water 7 is continually supplied to vessel 3. The simplified analysis result is described in the following table.

|  | Flow 6 | Flow 5 | Combustion flow 13 | Flow 8 | Flow 7 | Flow 16 |
| --- | --- | --- | --- | --- | --- | --- |
| Process pressure: 103 kpa | | | | | | |
| T, C. | 25.00 | 25.00 | 1507.23 | 285.85 | 25.00 | 96.76 |
| P, bar | 103.00 | 103.00 | 103.00 | 103.00 | 103.00 | 103.00 |
| Vapor Fraction | 0.37 | 0.00 | 1.00 | 0.97 | 0.00 | 1.00 |
| Enthalpy, MJ/h | −48993.34 | −15890.46 | −66883.84 | −178003.40 | −29353.13 | −199426.30 |
| Mass Flowrate, kg/h | 6362.13 | 2070.00 | 8432.14 | 15937.52 | 1850.00 | 16527.80 |
| H2O | 3000.00 | 1000.00 | 3998.55 | 10624.38 | 1850.00 | 12474.38 |
| C | 0.00 | 1000.00 | 0.00 | 0.00 | 0.00 | 0.00 |
| CO | 0.00 | 0.00 | 3.26 | 0.00 | 0.00 | 0.00 |
| CO2 | 0.00 | 0.00 | 3659.02 | 3760.23 | 0.00 | 3760.23 |
| O2 | 2879.91 | 0.00 | 149.05 | 110.97 | 0.00 | 110.97 |
| Ar | 182.22 | 0.00 | 182.22 | 182.22 | 0.00 | 182.22 |
| Solids | 300.00 | 0.00 | 300.00 | 961.00 | 0.00 | 0.00 |
| S | 0.00 | 70.00 | 0.00 | 0.00 | 0.00 | 0.00 |
| SO2 | 0.00 | 0.00 | 139.88 | 0.00 | 0.00 | 0.00 |
| CaCO3 | 0.00 | 0.00 | 0.00 | 1.47 | 0.00 | 0.00 |
| CaSO4 | 0.00 | 0.00 | 0.00 | 297.25 | 0.00 | 0.00 |
| H2 | 0.00 | 0.00 | 0.16 | 0.00 | 0.00 | 0.00 |
| Process pressure: 200 kpa | | | | | | |
| T, C. | 25.00 | 25.00 | 1504.53 | 285.03 | 25.00 | 116.27 |
| P, bar | 200.00 | 200.00 | 200.00 | 200.00 | 200.00 | 200.00 |
| Vapor Fraction | 0.36 | 0.00 | 1.00 | 0.97 | 0.00 | 1.00 |
| Enthalpy, MJ/h | −49059.23 | −15890.46 | −66949.48 | −178375.30 | −26338.49 | −196268.30 |
| Mass Flowrate, kg/h | 6362.13 | 2070.00 | 8432.14 | 16028.98 | 1660.00 | 16323.26 |
| H2O | 3000.00 | 1000.00 | 3998.98 | 10609.84 | 1660.00 | 12269.84 |
| C | 0.00 | 1000.00 | 0.00 | 0.00 | 0.00 | 0.00 |
| CO | 0.00 | 0.00 | 2.28 | 0.00 | 0.00 | 0.00 |
| CO2 | 0.00 | 0.00 | 3660.56 | 3760.23 | 0.00 | 3760.23 |
| O2 | 2879.91 | 0.00 | 148.11 | 110.97 | 0.00 | 110.97 |
| Ar | 182.22 | 0.00 | 182.22 | 182.22 | 0.00 | 182.22 |
| Solids | 300.00 | 0.00 | 300.00 | 1067.00 | 0.00 | 0.00 |
| S | 0.00 | 70.00 | 0.00 | 0.00 | 0.00 | 0.00 |
| SO2 | 0.00 | 0.00 | 139.88 | 0.00 | 0.00 | 0.00 |
| CaCO3 | 0.00 | 0.00 | 0.00 | 1.47 | 0.00 | 0.00 |
| CaSO4 | 0.00 | 0.00 | 0.00 | 297.25 | 0.00 | 0.00 |
| H2 | 0.00 | 0.00 | 0.11 | 0.00 | 0.00 | 0.00 |

-continued

|  | Flow 6 | Flow 5 | Combustion flow 13 | Flow 8 | Flow 7 | Flow 16 |
|---|---|---|---|---|---|---|
| Process pressure: 1500 kpa | | | | | | |
| T, C. | 25.00 | 25.00 | 1871.76 | 289.39 | 25.00 | 192.23 |
| P, bar | 1500.00 | 1500.00 | 1500.00 | 1500.00 | 1500.00 | 1500.00 |
| Vapor Fraction | 0.45 | 0.00 | 0.99 | 0.97 | 0.00 | 1.00 |
| Enthalpy, MJ/h | −32752.59 | −15890.46 | −50643.00 | −178942.00 | −17215.22 | −188187.80 |
| Mass Flowrate, kg/h | 5262.13 | 2070.00 | 7332.14 | 15992.22 | 1085.00 | 15811.50 |
| H2O | 2000.00 | 1000.00 | 2995.57 | 10673.08 | 1085.00 | 11758.08 |
| C | 0.00 | 1000.00 | 0.00 | 0.00 | 0.00 | 0.00 |
| CO | 0.00 | 0.00 | 18.41 | 0.00 | 0.00 | 0.00 |
| CO2 | 0.00 | 0.00 | 3635.21 | 3760.23 | 0.00 | 3760.23 |
| O2 | 2879.91 | 0.00 | 160.35 | 110.97 | 0.00 | 110.97 |
| Ar | 182.22 | 0.00 | 182.22 | 182.22 | 0.00 | 182.22 |
| Solids | 200.00 | 0.00 | 200.00 | 967.00 | 0.00 | 0.00 |
| S | 0.00 | 70.00 | 0.00 | 0.00 | 0.00 | 0.00 |
| SO2 | 0.00 | 0.00 | 139.88 | 0.00 | 0.00 | 0.00 |
| CaCO3 | 0.00 | 0.00 | 0.00 | 1.47 | 0.00 | 0.00 |
| CaSO4 | 0.00 | 0.00 | 0.00 | 297.25 | 0.00 | 0.00 |
| H2 | 0.00 | 0.00 | 0.50 | 0.00 | 0.00 | 0.00 |

The preceding disclosure and description of the invention is illustrative and explanatory thereof. Various changes in the details of the illustrated construction may be made within the scope of the appended claims, without departing from the true intent of the invention. The invention should only be limited by the following claims and their legal equivalents.

I claim:

1. A method for vertically producing a steam and combustion gas mixture, the method comprising:
   mixing a carbon or hydrocarbon fuel and an oxidation gas containing oxygen;
   combusting the mixture at a controllable pressure and temperature so as to convert the fuel to a flowing gas and solid byproducts, said solid byproducts being in a solid or a liquid form;
   mixing liquid water into the flowing gas, said liquid water having suspended and dissolved solids and organics and being injected in an amount such that said liquid water is converted into steam while reducing the combustion gas temperature for generating produced gas;
   converting liquids to gas and solids so as to generate steam and solid waste;
   injecting a portion of said produced gas at a temperature lower than the combustion gas temperature through a fluid bed section below the combustion so as to increase the heat exchange duration and to cool combustion solid particles where the injected produced gas is injected below the combustion; and
   discharging the produced steam, gas and solid mixture.

2. The method of claim 1, wherein said carbon or hydrocarbon fuel is selected from a group consisting of coal, petcoke, asphaltin, vacuum residuals or untreated crude oil in a slurry form;
   wherein said liquid water is selected from a group consisting of tailing pond water with levels of TSS, TDS and organics, brackish water, and sewage effluent water;
   wherein said oxidation gas is selected from a group consisting of oxygen, oxygen-enriched air and air in stoichiometric ratio; and
   wherein the produced gas injected through said fluid bed section is at a temperature range of between 150°C. and 500°C.

3. The method of claim 1, further comprising:
   incorporating a heat exchanger to use up to 45% of generated combustion heat to generate a super-heated steam and gas mixture from the steam and gas mixture.

4. The method of claim 1, wherein a temperature of the steam and solid waste in the step of converting are between 150°C. and 500°C., the pressure being between 103 kpa and 10,000kpa.

5. The method of claim 1, wherein an up-flow velocity of the produced gas injected through said fluid bed section is in a range of between 0.2 m/s and 6 m/s.

6. The method of claim 1, further comprising:
   flowing the discharged gas to a first cyclone solid separation so as to produce a lean gas flow, recycling the lean gas flow, and directing the lean gas flow back to the fluid bed section.

7. The method of claim 1, wherein the solid mixture is processed by a dry solids separation unit, the method further comprising the step of:
   removing solids from the gas flow for disposal.

8. The method of claim 1, the method further comprising:
   washing the gas by mixing the gas and steam with saturated water of a saturated temperature at the particular pressure so as to produce a saturated wet steam and combustion gas mixture, scrubbing any remaining solids from the gas, separating a liquid phase from the gas phase, and recycling water of the liquid phase with the scrubbed solids back to the fluid bed section.

9. The method of claim 7, further comprising:
   adding limestone slurry to the liquid water in a vessel where the lime reacts with sulfur while generating a gypsum solid.

10. The method of claim 9, further comprising:
    heating the steam and gas mixture in a heat exchanger with a gas phase from the step of combusting, the heated gas and steam mixture being solids-free and super-heated dry steam and gas mixture.

11. A method for producing a pressurized steam mixture for enhanced oil recovery comprising:
    combusting a mixture of fuel and oxidation gas under controllable pressures and temperatures to generate combustion gases;
    mixing the combustion gases with liquid having suspended solids in a vertical pressurized vessel to directly generate a mixture of combustion gas and steam from the liquid water;

evaporating the liquid water with the combustion gas mixture to leave the solids in a dry form and to reduce a temperature of the combustion gas;

recycling a portion of the generated combustion gas and steam mixture to a bottom of the vertical pressurized vessel to generate combustion gas steam fluid bed up-flow gas;

transferring the combustion gases to a dry-solid separator unit; and removing dry solids from the dry-solid separator unit.

12. The method of claim 11, further comprising:

transferring the combustion gas mixture to a steam generation and wash vessel;

washing the combustion gas mixture in the steam generation and wash vessel with water at a saturated temperature and pressure; and scrubbing any remaining solids from the combustion gas mixture to form a clean steam and gas mixture for injection into an underground formation for the enhanced oil recovery.

13. The method of claim 11, further comprising:

transferring the combustion gas mixture to a counter flow direct contact vessel;

mixing the combustion gas mixture with process water;

recovering heat from the combustion gas mixture and condensing steam to water while heating the liquid water to a temperature in the range of between 70°C.- 90°C. for an oil sand extraction facility for oil recovery.

* * * * *